United States Patent
Jung et al.

(10) Patent No.: US 9,165,176 B2
(45) Date of Patent: Oct. 20, 2015

(54) METHOD, APPARATUS, AND COMPUTER-READABLE RECORDING MEDIUM FOR RECOGNIZING FINGERPRINT

(71) Applicants: CRUCIALTEC CO., LTD., Chungcheongnam-do (KR); CRUCIALSOFT COMPANY, Seoul (KR)

(72) Inventors: Kyoung Shik Jung, Seoul (KR); In Seung Chung, Seoul (KR)

(73) Assignees: Crucialtec Co., Ltd., Gyeonggi-do (KR); Crucialsoft Company, Seoul (KR)

( * ) Notice: Subject to any disclaimer, the term of this patent is extended or adjusted under 35 U.S.C. 154(b) by 0 days.

(21) Appl. No.: 14/065,437

(22) Filed: Oct. 29, 2013

(65) Prior Publication Data

US 2014/0119620 A1    May 1, 2014

(30) Foreign Application Priority Data

Oct. 29, 2012    (KR) .................... 10-2012-0120606

(51) Int. Cl.
  *G06K 9/00*    (2006.01)
(52) U.S. Cl.
  CPC .................... *G06K 9/00026* (2013.01)
(58) Field of Classification Search
  None
  See application file for complete search history.

(56) References Cited

U.S. PATENT DOCUMENTS

| | | | | |
|---|---|---|---|---|
| 6,289,114 B1 * | 9/2001 | Mainguet | ...................... | 382/124 |
| 6,643,389 B1 * | 11/2003 | Raynal et al. | ................. | 382/124 |
| 7,587,072 B2 * | 9/2009 | Russo et al. | .................. | 382/124 |
| 7,809,168 B2 * | 10/2010 | Abiko et al. | .................. | 382/115 |
| 8,131,026 B2 * | 3/2012 | Benkley et al. | ............... | 382/124 |
| 8,175,345 B2 * | 5/2012 | Gardner | ....................... | 382/124 |
| 8,315,444 B2 * | 11/2012 | Gardner | ....................... | 382/124 |
| 8,724,861 B1 * | 5/2014 | Sun | ............................... | 382/124 |
| 8,903,142 B2 * | 12/2014 | Storm et al. | .................. | 382/124 |
| 2003/0161502 A1 * | 8/2003 | Morihara et al. | ............. | 382/115 |
| 2003/0214692 A1 * | 11/2003 | Carver | ......................... | 359/198 |
| 2004/0052407 A1 * | 3/2004 | Kawabe | ....................... | 382/124 |
| 2005/0041885 A1 * | 2/2005 | Russo | ........................... | 382/289 |
| 2005/0100200 A1 * | 5/2005 | Abiko et al. | .................. | 382/124 |
| 2008/0113685 A1 * | 5/2008 | Ishida et al. | ............... | 455/556.1 |
| 2008/0226132 A1 * | 9/2008 | Gardner | ....................... | 382/107 |
| 2009/0201257 A1 * | 8/2009 | Saitoh et al. | .................. | 345/173 |
| 2012/0206586 A1 * | 8/2012 | Gardner | .......................... | 348/77 |
| 2013/0234825 A1 * | 9/2013 | Malhotra et al. | ............. | 340/5.53 |
| 2013/0294660 A1 * | 11/2013 | Heilpern | ...................... | 382/124 |
| 2014/0003683 A1 * | 1/2014 | Vieta et al. | .................... | 382/124 |
| 2014/0056493 A1 * | 2/2014 | Gozzini | ....................... | 382/124 |

* cited by examiner

*Primary Examiner* — Randolph I Chu

(74) *Attorney, Agent, or Firm* — Saliwanchik, Lloyd & Eisenschenk

(57) ABSTRACT

Provided are a method, apparatus, and computer-readable recording medium for conveniently recognizing a fingerprint. A fingerprint recognition method according to an embodiment of the present invention includes: checking a position-state of a fingerprint sensing unit to set a flag value; collecting a plurality of fingerprint image segments sequentially acquired by the fingerprint sensing unit; and changing a matching order of the fingerprint image segments according to the flag value to perform the fingerprint recognition.

10 Claims, 5 Drawing Sheets

METHOD, APPARATUS, AND COMPUTER-READABLE RECORDING MEDIUM FOR RECOGNIZING FINGERPRINT

CROSS-REFERENCE TO RELATED APPLICATION AND CLAIM OF PRIORITY

This application claims priority to and the benefit of Korean Patent Application No. 10-2012-0120606, filed on Oct. 29, 2012, the disclosure of which is incorporated herein by reference in its entirety.

BACKGROUND

1. Field of the Invention

The present invention relates to a method, apparatus, and computer-readable recording medium for recognizing a fingerprint.

2. Discussion of Related Art

Recently, a variety of additional functions using personal information, such as mobile banking, in addition to a communication function, such as a phone call or text message transmission service, are provided through a mobile communication terminal. Thus, the importance of a locking device for a mobile communication terminal has prominently emerged.

Most prior art locking devices applied to the mobile communication terminal use passwords. Specifically, a lock device is applied to a local call function, alternate functions, or an international call function, and in order to use these functions, a user is prompted for a password.

However, the password paradigm has limitations in that the locking device is useless when the password is known to others and the subsequent necessity of periodically changing the password to ensure security, upon the password being compromised, is needed, and wherein the user forgets the password altogether.

Accordingly, in order to circumvent these limitations and to enhance the locking effect, a terminal equipped with a locking device using a fingerprint has been developed.

In order to mount such a fingerprint recognition apparatus on a small mobile communication terminal, a sensor for the fingerprint recognition apparatus should be minimized. Thus, a sliding-type fingerprint recognition sensor has been developed in which a user can allow his/her fingerprint to be recognized by sliding his/her finger on the sensor having the form of a laterally extending bar.

In general, fingerprint recognition is performed when a user slides his/her finger in one direction, for example, by holding his/her mobile communication terminal in his/her hand and then sliding his/her finger downward.

Accordingly, if the mobile communication terminal is upside down, the user should turn the mobile communication terminal right-side up (i.e., upright) before performing the fingerprint recognition procedure.

SUMMARY

The present invention is directed to a method, apparatus, and computer-readable recording medium for conveniently recognizing a fingerprint.

According to an aspect of the present invention, there is provided a fingerprint recognition method, including: checking a position-state of a fingerprint sensing unit to set a flag value; collecting a plurality of fingerprint image segments sequentially acquired by the fingerprint sensing unit; and changing a matching order of the fingerprint image segments according to the flag value to perform fingerprint recognition.

The position-state may be checked by a gyroscope, and the flag value may be set to "ON" when the position-state is normal, and the flag value may be set to "OFF" when the position-state is reversed.

The fingerprint image segments may be matched upward in the collection order to be used for fingerprint recognition when the flag value is set to "ON."

The fingerprint image segments may be matched downward in the collection order and then reversed vertically and horizontally to be used in the fingerprint recognition when the flag value is set to "OFF."

The fingerprint image segments may be reversed vertically in the collection order, matched upward, and then reversed horizontally to be used for fingerprint recognition when the flag value is set to "OFF."

According to another aspect of the present invention, there is provided a fingerprint recognition apparatus including: a position-state checking unit configured to check a position-state of a fingerprint sensing unit; a flag value setting unit configured to set a flag value according to the position-state checked by the position-state checking unit; a fingerprint sensing unit configured to collect a plurality of sequentially acquired fingerprint image segments; and a fingerprint recognition unit configured to change a matching order of the fingerprint image segments according to the flag value to perform fingerprint recognition.

The position-state checking unit may be connected to a gyroscope and configured to check the position-state.

The flag value setting unit may be configured to set the flag value to "ON" when the position-state is normal and set the flag value to "OFF" when the position-state is reversed.

The fingerprint recognition unit may be configured to match the fingerprint image segments upward in the collection order to perform the fingerprint recognition.

The fingerprint recognition unit may be configured to match the fingerprint image segments downward in the collection order and reverse the matched fingerprint image segments vertically and horizontally to perform the fingerprint recognition when the flag value is set to "OFF."

The fingerprint recognition unit may be configured to reverse the fingerprint image segments vertically within the collection order, then match the vertically reversed fingerprint image segments upward, and then reverse the matched fingerprint image segments horizontally to perform fingerprint recognition when the flag value is set to "OFF."

According to still another aspect of the present invention, there is provided a computer-readable recording medium storing a computer program for executing the fingerprint recognition method.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
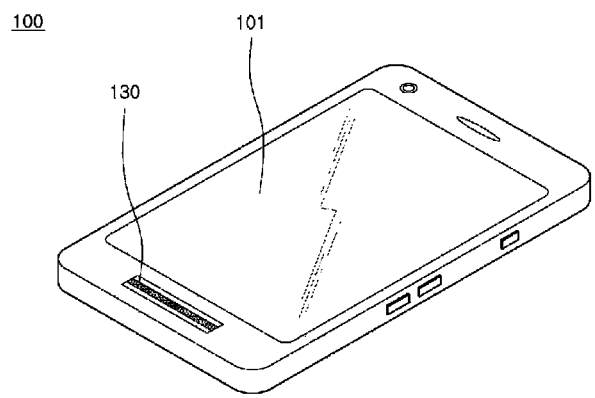
FIG. 1 is a block diagram showing an entire configuration of a fingerprint recognition apparatus according to an embodiment of the present invention.

The present invention will be described below in more detail with reference to the accompanying drawings. The present invention may, however, be embodied in different forms and should not be construed as limited to the embodiments set forth herein. In the drawings, anything unnecessary for describing the present invention will be omitted for clarity, and also, like reference numerals in the drawings denote like elements.

In this disclosure below, when one part is referred to as being "connected" to another part, it should be understood that the former can be "directly connected" to the latter, or "indirectly connected" to the latter via an intervening part. Furthermore, when one part is referred to as "comprising" (or "including" or "having") other elements, it should be understood that it can comprise (or include or have) only those elements, or other elements as well, if there are no specific limitations.

Preferred embodiments of the present invention will be described below in more detail with reference to the accompanying drawings.

FIG. 1 is a block diagram showing a structure of a fingerprint recognition apparatus according to an embodiment of the present invention.

With reference to FIG. 1, a fingerprint recognition apparatus 100 may include a fingerprint sensing unit 130 located in at least one portion thereof. In FIG. 1, the fingerprint sensing unit 130 is shown to be formed at one edge of the fingerprint recognition apparatus 100. However, the present invention is not limited thereto, and the fingerprint sensing unit 130 may be located at any point thereof.

The fingerprint recognition apparatus 100 according to an embodiment of the present invention may be a digital device that performs predetermined data processing to perform an operation desired by a user. The fingerprint recognition apparatus 100 may include an input unit and a display unit 101 and provide the state of an operation performed by a predetermined operational instruction from a user through the input unit to the user through the display unit. In FIG. 1, the display unit 101 of the fingerprint recognition apparatus 100 is shown to be implemented as a touch screen and also configured to include the function of the input unit. However, the input unit may be implemented as a keyboard or keypad and provided separately from the display unit 101.

The fingerprint recognition apparatus 100 according to an embodiment of the present invention can be manifested as a digital device including a memory and a microprocessor to have operational capabilities, such as a tablet PC, a smartphone, a personal computer, a workstation, a PDA, a web pad, a mobile phone, a navigator, and the like.

The fingerprint sensing unit 130 according to an embodiment of the present invention may be implemented as a sliding-type fingerprint sensing unit. The sliding-type fingerprint sensing unit 130 performs fingerprint recognition by sensing the fingerprint of a sliding finger, reading fingerprint image segments, and matching the fingerprint image segments into one image to implement an entire fingerprint image.

Figure 2:
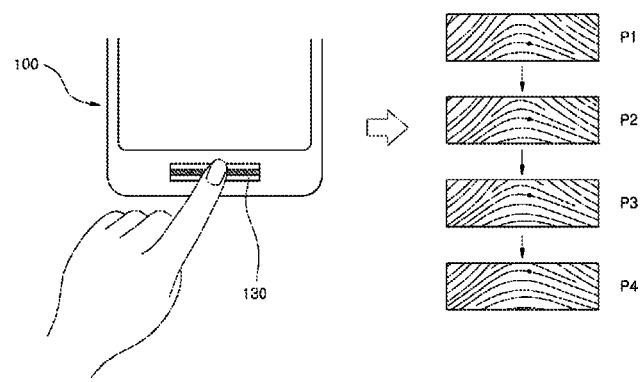
FIG. 2 is an exemplary view showing an example of a fingerprint image segment obtained by a fingerprint sensing unit according to an embodiment of the present invention.

FIG. 2 is an exemplary view showing an example of a fingerprint image segment obtained by a fingerprint sensing unit according to an embodiment of the present invention. For example, when a user contacts and slides his/her index finger on the fingerprint sensing unit 130, partial image segments P1 to P4 are acquired continuously.

More specifically, the fingerprint images of the user are acquired fragmentarily, but sequentially. The fingerprint sensing unit 130 then matches the read fingerprint image segments into one fingerprint image.

Figure 3:
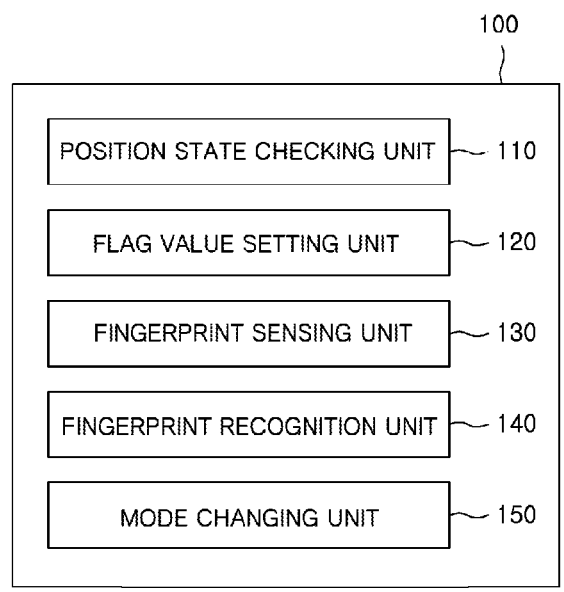
FIG. 3 is a block diagram showing an internal configuration of the fingerprint recognition apparatus according to an embodiment of the present invention.
Figure 4:
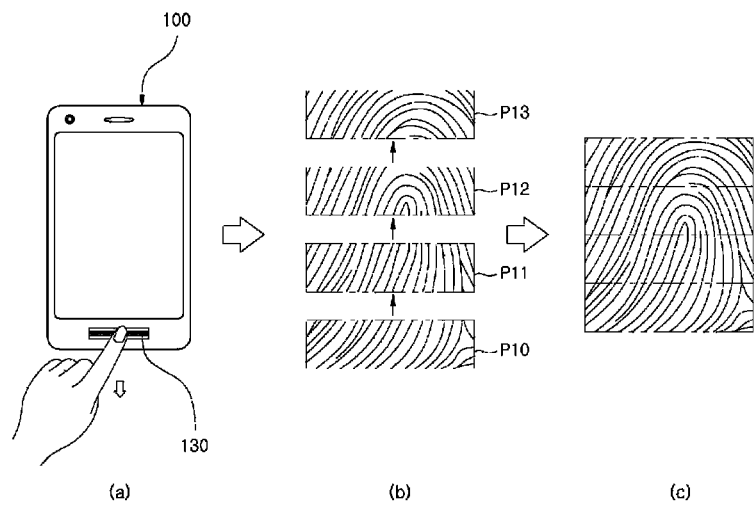
FIG. 4 is an exemplary view showing a fingerprint recognition process when the fingerprint recognition apparatus is in a normal position according to an embodiment of the present invention.
Figure 5:
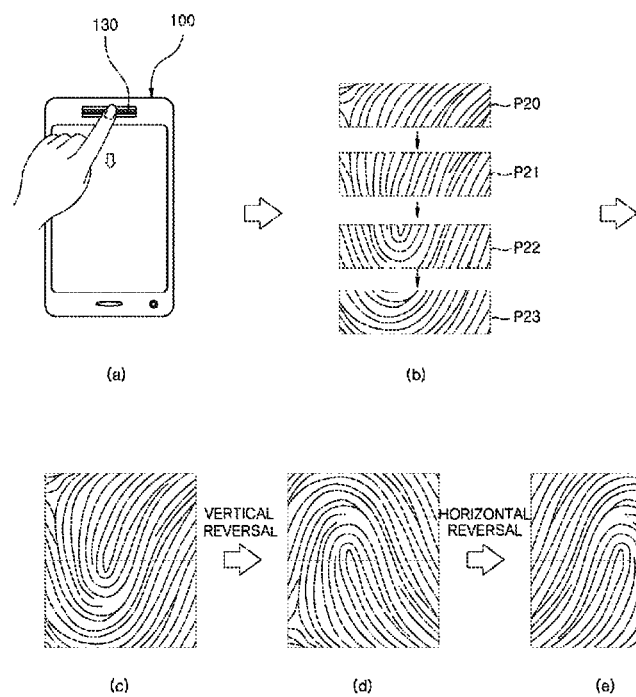
FIG. 5 is an exemplary view showing a fingerprint recognition process when the fingerprint recognition apparatus is in a reverse position according to an embodiment of the present invention.

FIG. 3 is a block diagram showing an internal configuration of the fingerprint recognition apparatus according to an embodiment of the present invention, FIG. 4 is an exemplary view showing a fingerprint recognition process when the fingerprint recognition apparatus is in a normal position according to an embodiment of the present invention, and FIG. 5 is an exemplary view showing a fingerprint recognition process when the fingerprint recognition apparatus is in a reverse position according to an embodiment of the present invention.

As shown in FIG. 3, first, a fingerprint recognition apparatus 100 may include a position-state checking unit 110, a flag value setting unit 120, a fingerprint sensing unit 130, and a fingerprint recognition unit 140.

According to an embodiment of the present invention, the position-state checking unit 110, the flag value setting unit 120, the fingerprint sensing unit 130, and the fingerprint recognition unit 140 may each be a program module or hardware device. The program module or hardware device may be an operating system, an application program module, or another program module, which may be included in the fingerprint recognition apparatus 100, or another apparatus capable of data communication with the fingerprint recognition apparatus 100, and physically stored in a type of memory device. The program module or hardware device may include, but is not limited to, a routine, subroutine, program, object, component, data structure, and the like, for performing a specific task and executing a specific type of abstract data.

In addition, the fingerprint sensing unit 130 according to an embodiment of the present invention may be implemented as a sliding-type fingerprint sensor, as described with reference to FIGS. 1 and 2. When a user contacts his/her finger on a recognition window of the fingerprint sensing unit 130 and slides his/her finger at a certain speed, the fingerprint may be scanned to acquire the fingerprint image segment. The sliding-type fingerprint sensor may be referred to as a "bar type" or "line type" fingerprint sensor according to the shape of the recognition window of the sliding-type fingerprint sensor.

In addition, the position-state checking unit 110 may check a position-state of the fingerprint sensing unit 130.

To this end, the position-state checking unit 110 may be connected to a gyroscope (not shown) and configured to check a position-state of the fingerprint sensing unit 130.

The gyroscope may be any type of gyroscope, such as a mechanical gyroscope. Furthermore, the gyroscope may include an attitude sensor using the gyroscope.

In addition, the flag value setting unit 120 may set a flag value according to the position-state checked in the position-state checking unit 110.

Specifically, the flag value setting unit 120 may set the flag value to "ON" when the position state is a normal state, and may set the flag value to "OFF" when the position state is a reversed state.

In general, the fingerprint sensing unit 130 may be constantly included in the fingerprint recognition apparatus 100. Thus, in the position-state checking unit 110, checking the position-state of the fingerprint sensing unit 130 may include checking the position-state of the fingerprint recognition apparatus 100. Accordingly, a normal position means the position-state of the fingerprint recognition apparatus is when the position-state for the fingerprint recognition apparatus is not upside down (i.e., upright, or right-side up). A reversed position means the position-state where the fingerprint recognition apparatus is upside down.

In addition, the fingerprint sensing unit 130 collects a plurality of sequentially acquired fingerprint image segments.

Alternatively, the fingerprint recognition unit 140 may change a matching order of fingerprint image segments according to the flag value to perform the fingerprint recognition.

For example, the fingerprint recognition unit 140 may match the fingerprint image segments upward in the collection order to perform the fingerprint recognition when the flag value is set to "ON."

More specifically, as shown in FIG. 4A, when the fingerprint recognition apparatus 100 is in the normal state, the position-state checking unit 110 may check that the fingerprint recognition apparatus 100 is in the normal state, and the flag value setting unit 120 may set the flag value to "ON."

In addition, as shown in (b) and (c) of FIG. 4, when the fingerprint sensing unit 130 sequentially collects a plurality of fingerprint image segments P10 to P13, the fingerprint recognition unit 140 matches the fingerprint image segments upward in the collection order to perform the fingerprint recognition because the flag value is set to "ON."

Conversely, when the flag value is set to "OFF," the fingerprint recognition unit 140 may match the fingerprint image segments downward in the collection order into one fingerprint image and then reverse the fingerprint image vertically and horizontally to perform the fingerprint recognition.

More specifically, as shown in (a) of FIG. 5, when the fingerprint recognition apparatus 100 is in the reversed state, the position-state checking unit 110 may check that the fingerprint recognition apparatus 100 is in the reversed state, and the flag value setting unit 120 may set the flag value to "OFF."

In addition, as shown in (b) and (c) of FIG. 5, when the fingerprint sensing unit 130 sequentially collects a plurality of fingerprint image segments P20 to P23, the fingerprint recognition unit 140 matches the fingerprint image segments into one fingerprint image downward in the collection in order to perform the fingerprint recognition because the flag value is set to "OFF."

The fingerprint recognition unit 140 reverses the fingerprint image vertically as shown in (d) of FIG. 5, and then reverses the fingerprint image horizontally to perform the fingerprint recognition.

Figure 6:
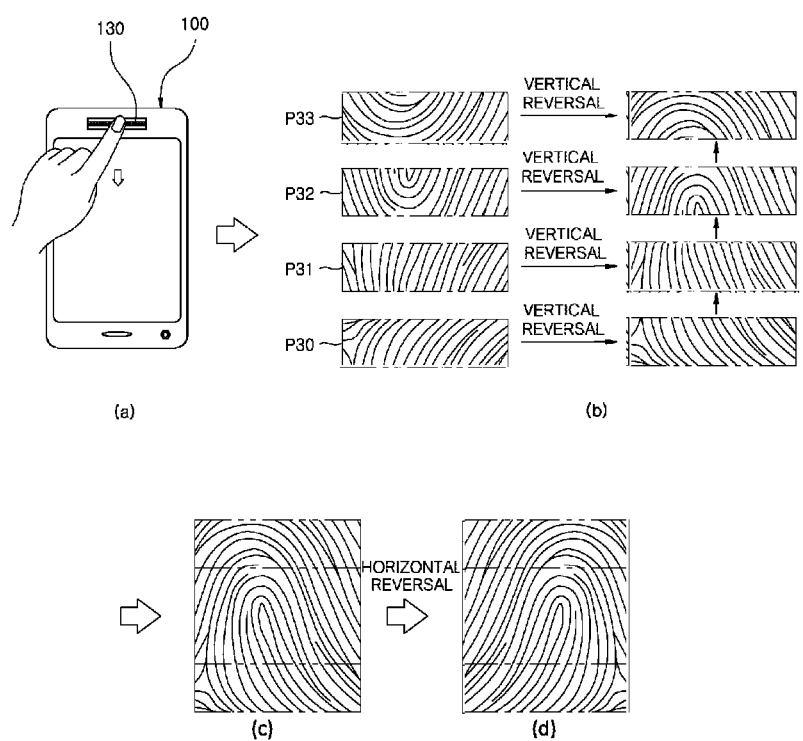
FIG. 6 is an exemplary view showing a fingerprint recognition process when the fingerprint recognition apparatus is in a reverse position according to another embodiment of the present invention.

FIG. 6 is an exemplary view showing a fingerprint recognition process when the fingerprint recognition apparatus is in a reverse position according to another embodiment of the present invention.

As shown in FIG. 6, when the flag value is set to "OFF," the fingerprint recognition unit 140 may reverse the fingerprint image segments vertically within the collection order, then match the fingerprint image segments upward into one fingerprint image, and then finally reverse the fingerprint image horizontally to perform the fingerprint recognition.

More specifically, as shown in (a) of FIG. 6, when the fingerprint recognition apparatus 100 is in the reversed state, the position-state checking unit 110 may check that the fingerprint recognition apparatus 100 is in the reversed state, and the flag value setting unit 120 may set the flag value to "OFF."

In addition, as shown in (b) and (c) of FIG. 6, when the fingerprint sensing unit 130 sequentially collects a plurality of fingerprint image segments P30 to P33, the fingerprint recognition unit 140 reverses the fingerprint image segments P30 to P33 vertically within the collection order and then matches the reversed fingerprint image segments upward into one fingerprint image.

In addition, as shown in (d) of FIG. 6, the fingerprint recognition unit 140 may reverse the fingerprint image horizontally to perform the fingerprint recognition.

As such, even when the fingerprint recognition apparatus 100 is upside down, the user can perform a general fingerprint scan procedure, more specifically, the user can complete a fingerprint scan by sliding his/her finger downward, thereby conveniently performing fingerprint recognition.

The use of the position-state checking unit 110 and the flag value setting unit 120 may be selected. To this end, the fingerprint recognition apparatus 100 may further include a mode changing unit 150 for selecting a use mode.

Figure 7:
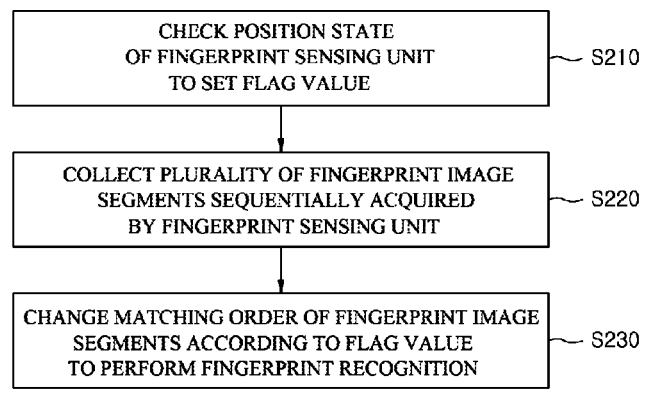
FIG. 7 is a flowchart describing a fingerprint recognition method according to an embodiment of the present invention.

FIG. 7 is a flowchart describing a fingerprint recognition method according to an embodiment of the present invention.

As shown in FIG. 7, the method may include checking a position-state of a fingerprint sensing unit to set a flag value in operation S210.

The position-state may be checked by a gyroscope. The flag value may be set to "ON" when the position-state is normal, and the flag value may be set to "OFF" when the position-state is reversed.

Here, the position-state means a position state of a fingerprint sensing unit, more specifically, a position state of a fingerprint recognition apparatus. A normal state means the position-state for the fingerprint recognition apparatus is not upside down (i.e., upright or right-side up). The reversed state means the position-state in for fingerprint recognition apparatus is upside down.

Subsequently, the method may include collecting a plurality of fingerprint image segments sequentially acquired by the fingerprint sensing unit in operation S220.

In addition, the method may include changing a matching order of the fingerprint image segments according to the flag value to perform the fingerprint recognition in operation S230.

Here, when the flag value is set to "ON," the fingerprint image segments may be matched upward in the collection order to be used in the fingerprint recognition.

However, when the flag value is set to "OFF," the fingerprint image segments are matched downward in the collection order and then reversed vertically and horizontally to be used in the fingerprint recognition.

Alternatively, when the flag value is set to "OFF," the fingerprint image segments may be vertically reversed within the collection order, matched upward, and then horizontally reversed to be used in the fingerprint recognition.

According to the present invention, fingerprint recognition is possible even when the finger is slid downward on a fingerprint recognition apparatus that is upside down, or alternatively described as, when the finger is slid upward on the fingerprint recognition apparatus in the normal state.

According to the present invention, fingerprint recognition can be conveniently performed because the fingerprint recognition is possible even when the finger is slid downward on a reversed fingerprint recognition apparatus, or alternatively described as, when the finger is slid upward on the fingerprint recognition apparatus in the normal state.

The effects of the present invention are not limited to the above and should be understood as including all effects that can be inferred from a configuration of the present invention as described in the detailed description and claims of the present invention.

The above-described embodiments of the present invention may be implemented as programmable instructions executable by a variety of computer components and stored in a computer readable recording medium. The computer readable recording medium may include program instructions, a data file, a data structure, or any combination thereof. The program instructions stored in the computer readable recording medium may be designed and configured specifically for the present invention or can be publicly known and available to those skilled in the field of software. Examples of the computer readable recording medium include a hardware device specially configured to store and perform program instructions, for example, a magnetic medium, such as a hard disk, a floppy disk, and a magnetic tape, an optical recording medium, such as a CD-ROM, a DVD, and the like, a magneto-optical medium, such as a floptical disc, a ROM, a RAM, a flash memory, and the like. Examples of the program instructions include machine codes made by, for example, a compiler, as well as high-level language codes executable by a computer using an interpreter. The above exemplary hardware device can be configured to operate as one or more software modules in order to perform the operation in an exemplary embodiment, and vice versa.

It will be understood by those skilled in the art that the above description is illustrative and various changes in form and details may be made therein without departing from the spirit or essential features of the invention. Accordingly, the above embodiments are to be regarded as illustrative rather than restrictive. For example, while a single element may be distributed and then carried out, distributed elements may be carried out in a combination thereof.

Therefore, the scope of the invention is defined by the appended claims, and a variety of embodiments within the scope of the invention should be construed as being included in the present invention.

What is claimed is:

1. A fingerprint recognition method comprising:
   checking a position-state of a fingerprint sensing unit to set a flag value, wherein the position-state including a normal state and a reversed state;
   collecting a plurality of fingerprint image segments sequentially acquired by the fingerprint sensing unit; and
   changing a matching order of the fingerprint image segments according to the flag value to perform the fingerprint recognition;
   wherein the position-state is checked by a gyroscope, and the flag value is set to "ON" when the position state is normal, and the flag value is set to "OFF" when the position state is reversed.

2. The fingerprint recognition method of claim 1, wherein, when the flag value is set to "ON," the fingerprint image segments are matched upward in the collection order to be used in the fingerprint recognition.

3. The fingerprint recognition method of claim 1, wherein, when the flag value is set to "OFF," the fingerprint image segments are matched downward in the collection order and reversed vertically and horizontally to be used in the fingerprint recognition.

4. The fingerprint recognition method of claim 1, wherein, when the flag value is set to "OFF," the fingerprint image segments are reversed vertically within the collection order, matched upward, and then reversed horizontally to be used in the fingerprint recognition.

5. A non-transitory computer-readable recording medium storing a computer program for executing a fingerprint recognition method, the method comprising:
   checking a position-state of a fingerprint sensing unit to set a flag value, wherein the position-state including a normal state and a reversed state;
   collecting a plurality of fingerprint image segments sequentially acquired by the fingerprint sensing unit; and
   changing a matching order of the fingerprint image segments according to the flag value to perform the fingerprint recognition;
   wherein the position-state is checked by a gyroscope, and the flag value is set to "ON" when the position state is normal, and the flag value is set to "OFF" when the position state is reversed.

6. A fingerprint recognition apparatus, comprising:
   a position-state checking unit configured to check a position-state of a fingerprint sensing unit, wherein the position-state including a normal state and a reversed state;
   a flag value setting unit configured to set a flag value according to the position-state checked by the position-state checking unit;
   a fingerprint sensing unit configured to collect a plurality of sequentially acquired fingerprint image segments; and
   a fingerprint recognition unit configured to change a matching order of the fingerprint image segments according to the flag value to perform the fingerprint recognition;
   wherein the position-state checking unit is connected to a gyroscope and configured to check the position-state.

7. The fingerprint recognition apparatus of claim 6, wherein the flag value setting unit is configured to set the flag value to "ON" when the position state is normal and to set the flag value to "OFF" when the position state is reversed.

8. The fingerprint recognition apparatus of claim 7, wherein the fingerprint recognition unit is configured to match the fingerprint image segments upward in the collection order to perform the fingerprint recognition when the flag value is set to "ON."

9. The fingerprint recognition apparatus of claim 7, wherein the fingerprint recognition unit is configured to match the fingerprint image segments downward in the collection order and reverse the matched fingerprint image segments vertically and horizontally to perform the fingerprint recognition when the flag value is set to "OFF."

10. The fingerprint recognition apparatus of claim 7, wherein the fingerprint recognition unit is configured to reverse the fingerprint image segments vertically within the collection order, match the vertically reversed fingerprint image segments upward, and then reverse the fingerprint image segments horizontally to perform the fingerprint recognition.

* * * * *